United States Patent Office 3,442,815
Patented May 6, 1969

3,442,815
GENERATION OF LIGHT BY THE REACTION OF OXALIC-TYPE AMIDES WITH HYDROPEROXIDES IN THE PRESENCE OF A FLUORESCENT COMPOUND
Michael McKay Rauhut, Norwalk, and Laszlo Joseph Bollyky, Stamford, Conn., assignors to American Cyanamid Company, Stamford, Conn., a corporation of Maine
No Drawing. Filed Jan. 12, 1966, Ser. No. 520,052
Int. Cl. C09k 1/02; B01j 1/00
U.S. Cl. 252—188.3                8 Claims

ABSTRACT OF THE DISCLOSURE

A method for obtaining chemiluminescent light by the reaction of an amide derivative of an oxalic type acid, said amide derivative being formed by reaction with an amine which is at least as acidic as 4-nitroaniline, with a hydroperoxide in the presence of a fluorescer and a solvent, the chemiluminescent composition, and components of some of the ingredients in the composition.

---

The present invention relates to novel oxalic-type amide compositions of matter, their reactions, the direct generation of light from chemical energy employing such compositions and, improvements in the basic oxalic-type chemiluminescent system by the employment of a superior class of oxalic-type amide compositions and/or by the employment of a superior class of diluents (solvents) with the basic oxalic amide-type compositions. By "light" as referred to herein is meant electromagnetic radiation at wavelengths falling between about 350 m$\mu$ and about 800 m$\mu$.

The art of generating light from chemical energy, i.e., chemiluminescence, is continually in search of compositions which when reacted substantially improve the intensity and lifetime of light emission as contrasted to known chemiluminescent compositions and reactions. Obviously improved compositions are constantly in demand for use as signal devices, for area illumination, etc.

The art has known for some time that oxalyl chloride in combination with aqueous (30%) hydrogen peroxide and a fluorescent compound generates a light whose lifetime is very short (on the order of about 8 to 30 seconds) and whose intensity is of little practical utility.

According to a publication by Edward A. Chandross (Tetrahedron Letters No. 12, pp. 761–765, 1963), the chemiluminescent reaction employing oxalyl chloride may be represented as follows:

(1)
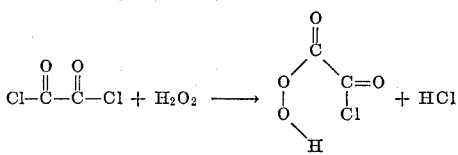

followed by reaction (2)
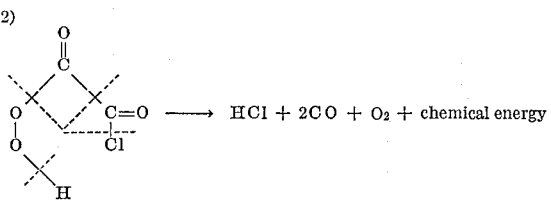

In the above reactions, a cyclic transition structure is first formed, followed by a breakdown of the ring into hydrochloric acid, carbon monoxide, oxygen, and chemical energy. It is clear that an essential mechanistic feature of the Chandross reaction, as represented by Chandross, is the splitting out of HCl from a six-membered cyclic transition state. Thus the process as described by Chandross requires the specific structure (2) since any alteration that eliminates the possibility of HCl elimination in a cyclic transition state would defeat the chemiluminescent process.

An extensive investigation which we have carried out has shown that, contrary to the teachings of Chandross, certain other oxalic acid compounds when reacted under particular conditons can unexpectedly provide chemiluminescence.

The mechanism of the oxalyl chloride reactions (as represented by Chandross) is an entirely different and distinct mechanism from that of this invention disclosed herein.

Thus in copending application 20,706, a new chemiluminescent reaction of oxalic-type acid anhydrides is disclosed; in copending application 20,829, a new chemiluminescent reaction of oxalic esters is disclosed, and in the present application a new chemiluminescent reaction of certain oxalic or oxalic-type "amides" is disclosed.

The mechanisms by which chemiluminescent light may be generated are so poorly understood that it is not possible at present to predict those structures which convey the chemiluminescent property. This is amply illustrated by the phthalhydrazide series of compounds, some of which are chemiluminescent and some of which are not chemiluminescent (see A. Bernanose, Bull. Soc. Chim. France, 17,567 (1950)).

It is particularly difficult to predict reactions which are capable of delivering high light intensities over extended lifetimes, and which thus fulfill the useful lighting requirements. Only a few reactions are known capable of providing even moderate light intensity (see K. D. Gunderman, Angew. Chemie, Int. Ed., 4, 566 (1965)) and none of these are known to provide sufficient light for practical purposes. Moreover, since the mechanisms are not known for any of these moderately bright reactions, they are not useful for predictive purposes. The chemiluminescent reaction disclosed in the present application is particularly unexpected, since amides are known to have substantially different properties from acid chlorides, anhydrides, and esters (see L. E. Fieser and M. Fieser, Advanced Organic Chemistry, Reinhold Publishing Corp., New York, 1961, p. 519) and prior to this invention it was not known which properties convey the chemiluminescent properties.

It is an object of this invention to obtain a chemiluminescent composition and a process employing said composition whereby a high efficiency may be obtained in the conversion of chemical energy into light.

Another object is to obtain a chemiluminescent compound which produces light over an extended period of time.

Another object of this invention is to obtain a chemiluminescent composition which attains light of substantially higher intensity than has been obtained with former chemiluminescent compositions.

Another object of this invention is to obtain a chemiluminescent composition which may be employed to obtain light by a process which is mechanically simple and which is economically inexpensive.

Another object of this invention is to obtain a chemiluminescent reactant which is stable over a long period of time and which may be subsequently reacted to obtain chemiluminescent light.

Another object of this invention is to obtain a chemiluminescent reactant which when reacted will obtain chemiluminescent light by a process which is not hazardous.

The term "chemiluminescent reactant," as used herein, means (1) a mixture which will result in a chemiluminescent reaction when reacted with other necessary reactants in the processes as disclosed herein, or (2) a chemiluminescent composition.

The term "fluorescent compound," as used herein, means a compound which fluoresces in a chemiluminescent reaction, or a compound which produces a fluorescent compound in a chemiluminescent reaction.

The term "chemiluminescent composition," as used herein, means a mixture which will result in chemiluminescence.

The term "admixture," as used herein, means "reacting" or sufficiently bringing together component reactants to obtain a chemiluminescent reaction.

The term "hydroperoxide compound" as used herein is limited to peroxide compounds having at least one HOO— group, or a compound which upon reaction produces a compound with such a group.

The term "peroxidic groups" as used herein, represents HOO—, AOO—, or

A and B are typically defined as a substituent such as alkyl, cycloalkyl, α-hydroxyalkyl, substituted alkyl, for example, where B may additionally be aryl.

The term "diluent," as used herein, means a solvent or a vehicle which when employed as a solvent does not cause insolubility.

The term "peroxide compound," as used herein, also includes compounds which upon reaction produce the peroxide group.

The term "hydrogen peroxide compound" includes (1) hydrogen peroxide and (2) hydrogen peroxide-producing compounds.

We have discovered that the objects of this invention are obtained by admixing reactants including (1) an oxalic-type amide derived from a parent-N(hydrogen-substituted)amine and/or other parent-N(hydrogen-substituted) nitrogen-derivatives, which amine and nitrogen-derivative are each more acidic than 4-nitroaniline, (2) a hydroperoxide, (3) a diluent, and (4) in the preferred embodiment, critically including an alkaline material where necessary in an amount at least sufficient to obtain a pH of at least above pH 5 and below about pH 12, where the reactants being admixed include at least one fluorescent compound or precursor thereof. The oxalic-type amide referred to above is an amide (a) of oxalic acid or (b) of a keto compound of the typical oxalic-type acid structure of the formula:

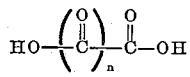

where $n$ ranges from 1 to about 4, and where the parent-amine or parent-nitrogen-derivative is sufficiently electron-attracting to be at least as acidic as 4-nitroaniline. An oxalic-type amide includes, for example, an amide (i.e., the above N-substituted amide or nitrogen derivative) of oxalic acid, ketomalonic acid, diketosuccinic acid, or triketoglutaric acid corresponding to the amide structure

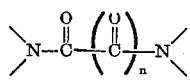

The oxalic-type amide of this invention is an amide of a "strongly-electronegatively substituted" parent-amine and/or other parent-nitrogen-derivative herein defined as an amine which bears (includes) electronegative substituents sufficiently electron-attracting to make the parent N(hydrogen-substituted) amine and/or the parent N(hydrogen-substituted) nitrogen-derivative at least as acidic as 4-nitro-aniline when compared under substantially similar conditions, such as in a common solvent of this invention. Typical examples of a "strongly-electronegatively N-substituted" nitrogen-derivative which is more acidic than 4-nitroaniline typically include amides, imides, sulfonamides, imidazoles, and anilines, said anilines having a number of electronegative substituent groups sufficient to provide the necessary number for the sum of the substituent constants (sigma values) of the substituents to approximate the value of the substituent constant of a nitro group (i.e., 0.7).

It was discovered that an unexpectedly high and therefore superior order of chemiluminescence is obtained from the above oxalic-type amide-composition chemiluminescent system by (1) employing therein an N(oxygenated-sulfur)substituted oxalic-type amide and/or (2) employing a diluent (solvent) having a high degree (order) of polarity such as acetonitrile, for example. Unexpected superiority of the sulfo substituent as an electronegative substituent additionally brings the oxygen compounds of phosphorous into the scope of the discovery, because of similar properties of electronegativity.

The preferred strongly-electronegatively N-substituted nitrogen-derivative of an oxalic-type acid is an amide of the formula:

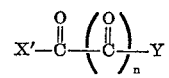

where $n$ ranges from 1 (including 1) to about 4; where X' is a N-substituted member selected from the group consisting of (a) 

(b) 

(c) 

(e) R⁶—N=N—, and (f) strongly electronegatively N-substituted(substituted or nonsubstituted) nitrogen-containing heterocyclic compounds where the N— is attached directly to the carbonyl carbon of the oxalic acid or oxalic-type acid-derivative, typical N-substituted nitrogen-containing heterocyclic compounds including compounds of the formulae

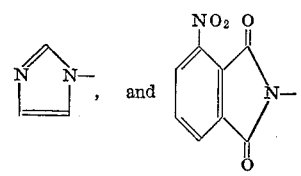

where any one or more of the heterocyclic compounds may include typical electronegative substituents such as above $a$ through $e$ including cyano, halogen, sulfo, oxygen-substituted phosphorous substituents, etc.; where R' and R⁵ are each selected from the electronegative group consisting of (a) mono-, poly-, and heterocyclic aromatic compounds substituted by at least one electronegative group, where the electronegative group on said aromatic compound is typically a member selected from the groups consisting of (A) nitro, (B) a halogen, provided at least three halogen substituents as present in the amide, (C) oxygenated-sulfur substituents such as (1) 

(2) 

(3) 

and

where R' and R⁸ are each selected from the group consisting of alkyl, aryl, cycloalkyl, heterocyclic, and polycyclic substituents, and where R⁹ and R¹⁰ are each selected from the group consisting of hydrogen and the members of R⁷ defined above, (D) cyano, (E) a polyfluoroalkyl substituent such as F₃C—, F₅C₂—, FC₃—, F₂CH—, and F₂C₂H₂(CH₃)—, F₃C₂H₂—, F₂C₃H₅—, and the like, and (F) an acyl substituent of the formula

where R'' is defined the some as R⁹, provided that said aromatic compound includes a sufficient number of electronegative members to obtain an acidity at least as great as 4-nitroaniline, (b) a polyfluoroalkyl substituent as defined above, and (c) an acyl substituent as defined above; where R² and R⁶ are each selected from the group consisting of hydrogen and the members of R⁴, where R⁴ is selected from the group consisting of alkyl, aryl, cycloalkyl, heterocyclic, polycyclic, amino, and alkyl— or aryl— or acyl-substituted amino substituents; where R³ is selected from the group consisting of the members of both R¹ and R²; where Z is a member selected from the group consisting of (a) cyano (i.e., NC—), (b) nitrosyl (ON—), (c) nitroxyl (O₂N—), (d) oxygenated-sulfur substituents such as (1)

(2)

(3)

and (4)

where R⁷, R⁸ are defined above and R¹² and R¹³ are each defined the same as R⁷ and (e) oxygen-substituted phosphorous substituents such as

and

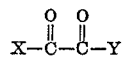

where R¹⁴ and R¹⁵ are defined the some as R²; where Y is a member selected from the group consisting of hydroxy (HO—) and the members of X' defined above.

(A) Typical oxamides of the type $$X-\overset{O}{\underset{}{C}}-\overset{O}{\underset{}{C}}-Y$$

where X=Y are:

| | | |
|---|---|---|
| (a) | ![structure] O₂S—N— with naphthalene-NO₂ | 2,2'-oxalylbis[3-nitro-2H-naphth[1,8-cd]isothiazole] 1,1,1',1'-tetraoxide. |
| (b) | (C₆H₅)₂P(=O)—N(H)— | N,N'-bis(diphenylphosphinyl)-oxamide. |
| (c) | O₂N—C₆H₃(NO₂)—N(—C₆H₄NO₂)— | N,N'-bis(2,4-dinitrophenyl)-N,N'-bis(p-nitrophenyl)-oxamide. |
| (d) | CH₃O—N(H)— | N,N'-dimethoxyoxamide. |
| (e) | [pyridyl-CN—N—]₂ | N,N,N',N'-tetrakis(3-cyano-4-pyridyl)oxamide. |
| (f) | (CH₃)₂N—N(NO)— | N,N'-bis(dimethylamino)-N,N'-dinitrosooxamide. |
| (g) | [(C₆H₅)₂NSO₂]₂—N— | N,N,N',N'-tetrakis(diphenylsulfamoyl)oxamide. |
| (h) | C₆H₅—C(=O)-thiazolyl—N(—C₆H₄NO₂)— | N,N'-bis(4-benzoyl-2-thiazolyl)-N,N'-bis(p-nitrophenyl)oxamide. |
| (i) | [(CH₃)₂P(=O)—C₆H₃(NO₂)—N(CH₃)—]₂ | N,N,N',N'-tetrakis[4-(dimethylphosphinyl)-6-nitro-o-tolyl]-oxamide. |

| | | |
|---|---|---|
| (j) |  | N,N'-dinitro-N,N'-bis-(pentafluorophenyl)-oxamide. |
| (k) |  | N,N,N',N'-Tetrakis-(phenylsulfonyl)oxamide. | and (B) Typical oxanic acids of the type $$X-\overset{O}{\underset{\|}{C}}-\overset{O}{\underset{\|}{C}}-Y$$

where Y=OH and X equals:

| | | |
|---|---|---|
| (a) | 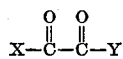 | N,N-bis(p-nitrophenyl)-oxamic acid. |
| (b) |  | N-(4-carboxy-2-thiazolyl)-N-(phenylsulfonyl)oxamic acid. |
| (c) | 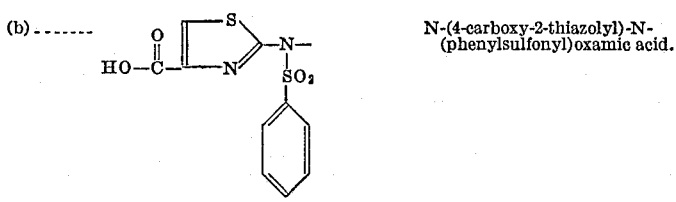 | N-(p-nitrophenyl)-N-(phenylsulfonyl)oxamic acid. |
| (d) | 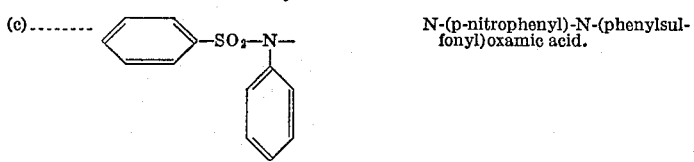 | N-[2-nitro-4-(N-bromo-N,N,N-trimethylammonio)phenyl]-N-(phenylsulfonyl)oxamic acid. |
| (e) | 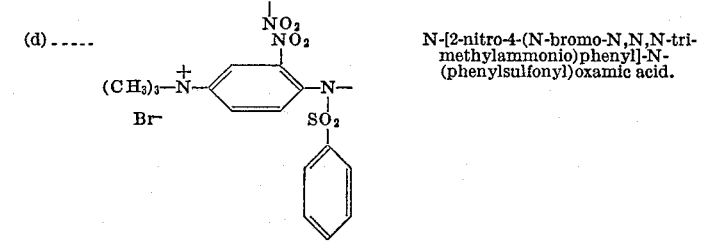 | N-(2,4-dinitrophenyl)-N-(phenylsolfonyl)oxamic acid. |
| (f) | 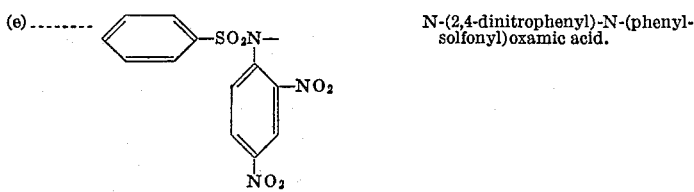 | 2,2'-oxalylbis[2H-naphtho[1,8-cd]isothiazole-4,7-disulfonic acid] 1,1,1',1'-tetraoxide. |
| (g) | 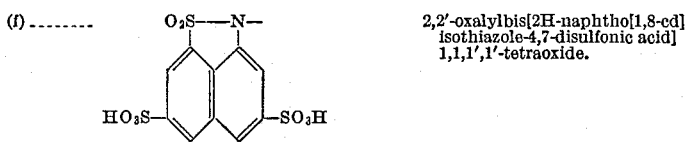 | N-(p-cyanophenyl)-N-nitrosooxamic acid. |
| (h) |  | 1,1'-oxalylbis[3-nitropyrrole]. |
| (i) |  | N,N'-oxalylbis[dicyanomaleimide]; |
| (j) |  | N-nitro-N-(pentafluorophenyl) oxamic acid. |

Typical examples of the improvement-invention, for example, are sulfonamides of the type

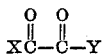

where X=Y and where X equals:

| | | |
|---|---|---|
| (a) | ⟨phenyl⟩—SO$_2$—N— \ C=O \ ⟨phenyl⟩ | N,N'-dibenzoyl-N,N'-bis-(phenylsulfonyl)oxamide. |
| (b) | ⟨phenyl⟩—SO$_2$—N— \ ⟨thiazole⟩ | N,N'-bis(phenylsulfonyl)-N,N'-di-2-thiazolyloxamide. |
| (c) | CH$_3$—⟨phenyl⟩—SO$_2$—N— \ ⟨pentafluorophenyl⟩ | N,N'-bis(pentafluorophenyl)-N,N'-bis(p-tolylsulfonyl)-oxamide. |
| (d) | ⟨pyridyl⟩—SO$_2$N— \ NO$_2$ | N,N'-dinitro-N,N'-bis-(4-pyridylsulfonyl)-oxamide. |
| (e) | O$_2$S—N— \ ⟨naphthisothiazole⟩ \ SO$_3$H   NO$_2$ | 2,2'-oxalyl-bis[5-nitro-2H-naphth-[1,8-cd]isothiazole-7-sulfonic acid] 1,1,1',1'-tetraoxide. |
| (f) | Cl$_3$P=N—SO$_2$N— \ ⟨phenyl⟩ | N,N'-bis(trichlorophosphoranylidenesulfamoyl)-oxanilide. |
| (g) | [(C$_6$H$_5$)$_2$N]$_3$—P=N—SO$_2$—N— \ CH$_3$ | N,N'-bis[tris(diphenylamino)-phosphoranylidenesulfamoyl]: N,N'-dimethyloxamide. |

Typical examples of the improvement-invention, for example, also include sulfonamides of the type

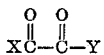

where Y=OH, and X equals:

| | | |
|---|---|---|
| (a) | ⟨phthalimido⟩N—SO$_2$—N— \ ⟨o-nitrophenyl⟩ | N-(o-nitrophenyl)-N-(phthalimidosulfonyl)-oxamic acid. |
| (b) | ⟨phenyl⟩—SO$_2$—N— \ ⟨2,4-dinitrophenyl⟩ | N-(2,4-dinitrophenyl)-N-(phenylsulfonyl)oxamic acid. |

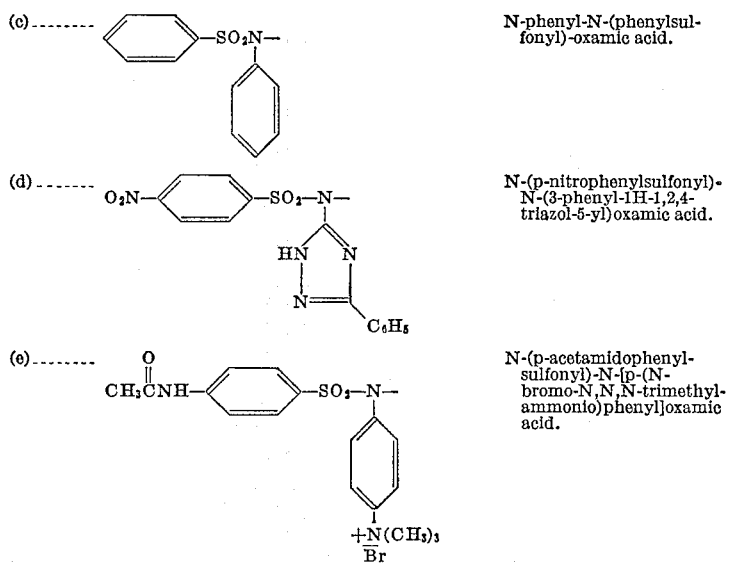

| | |
|---|---|
| (c) | N-phenyl-N-(phenylsulfonyl)-oxamic acid. |
| (d) | N-(p-nitrophenylsulfonyl)-N-(3-phenyl-1H-1,2,4-triazol-5-yl)oxamic acid. |
| (e) | N-(p-acetamidophenylsulfonyl)-N-[p-(N-bromo-N,N,N-trimethylammonio)phenyl]oxamic acid. |

Typical alkyl groups include methyl, ethyl, isopropyl, cyclohexyl, etc., and also include various substituted alkyl, such as the halogen-substituted alkyl groups, including trifluoromethyl, difluoromethyl, for example.

Typical aryl and typical heterocyclic groups include benzene, naphthalene, pyridine, thiazole, etc., including singly or multiple substituted forms thereof provided the substituent thereof has a positive Hammet sigma value, such as the electronegative substituents defined above, including the sulfoxy substituents defined above and the phosphoroxy substituents defined above.

The typical halogen would be any halogen, but preferably the more active one, i.e., fluoro, chloro, and bromo-.

The typical preferred halogen-substituted alkyls include difluoromethyl, difluoroethyl, trifluoromethyl, etc.

Typical alkoxycarbonyls and aryloxycarbonyls include methoxycarbonyl, ethoxycarbonyl, butoxycarbonyl, phenoxycarbonyl, etc.

N-substituted nitrogen-containing heterocyclic compounds in which the nitrogen of the heterocyclic compound is directly attached to a terminal carbonyl of the oxamic and oxamide type system include diazoles, triazoles, benztriazoles, phthalimide, 2,3-dihydro-1,4-phthalazinedione, maleimide, succinimide, cyanuric acid, histidine, etc. Any of these heterocyclics which are substituted by alkyl, aryl or electronegative groups, such as nitro, cyano, acyl, benzenesulfonyl, etc. are also to be included.

The hydroperoxide employed in the compositions and process of this invention may be obtained from any suitable peroxide compound. For example, the hydroperoxide may be employed as sodium peroxide. Alternatively, sodium perborate may be placed in aqueous solution whereby a solution of hydrogen peroxide is obtained. Obviously, hydrogen peroxide or its solution may be employed. The peroxide employed may be obtained from anhydrous hydrogen peroxide compounds such as perhydrate of urea (urea peroxide), perhydrate of pyrophosphate (sodium pyrophosphate peroxide), perhydrate of histidine (histidine peroxide), sodium perborate, and the like. Still another form in which the $H_2O_2$ may be provided in the composition is that of an anhydrous solution of $H_2O_2$ in a suitable solvent such as an ether, an ester, an aromatic hydrocarbon, etc. of the type which would provide a suitable diluent for the composition of this invention. Alternatively, the hydroperoxide employed in the composition or process could be any compound having a hydroperoxidic group, such as a hydroperoxide (ROOH) or a peroxy acid

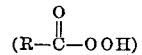

such as t-butyl hydroperoxide and perbenzoic acid. Whenever hydrogen peroxide is contemplated to be employed, any suitable compound may be substituted which will produce hydrogen peroxide.

The hydroperoxide concentration may range from about 15 molar down to about $10^{-5}$, preferably about 2 molar down to about $10^{-4}$ molar. The amide of this invention may be added as a solid or in admixture with a suitable solid peroxide reactant or in a suitable diluent, or alternatively dissolved directly in a solution containing the peroxide reactant.

Typical diluents within the purview of the instant broad oxalic amide-type system discovery are those that do not readily react with a peroxide, such as hydrogen peroxide, and which do not readily react with an amide of oxalic acid.

Although the addition of water is not necessary for the production of chemiluminescent light in certain embodiments according to the present invention, water can serve as the diluent or partial diluent. The term "water," as used herein, includes water-producing compounds, such as hydrates. In addition, however, either one or more diluents may be included with or in the place of the water, as long as the peroxide employed is at least partially soluble in the diluent(s), such as, for example, at least one gram of $H_2O_2$ per liter of diluent. The following are illustrative of the additional diluents or solvents which may be employed: non-cyclic or cyclic ethers, such as diethyl ether, diamyl ether, tetrahydrofuran, dioxane, and the like; esters, such as ethyl acetate, propyl formate, amyl acetate, dimethyl phthalate, diethyl phthalate, methyl benzoate, and the like; aromatic hydrocarbons, such as benzene, xylene, toluene, and the like.

It was discovered for the broad oxalic amide-type system, and particularly for the sulfoxy substituted type of the oxalic amide-type system, that the employment of a solvent having a high order of polarity substantially increases the intensity and lifetime of the chemiluminescent reaction. The degree of improvement is roughly directly proportional to the degree of polarity which characterizes the particular solvent (diluent). Typical diluents having a high order of polarity include acetonitrile, 1,2-dimethoxyethane, dimethylformamide, and the like. In contrast to the chemiluminescent system of this invention, the ester system (of copending application, Ser. No. 491,896) appears to perform more satisfactorily in nonpolar solvents.

The fluorescent and/or fluorescer-precusor compounds contemplated herein are numerous; and they may be defined broadly as those which do not readily react on contact with the peroxide employed in this invention, such as hydrogen peroxide; likewise, they do not readily react on contact with the amide of oxalic or oxalic-type acid. Typical suitable fluorescent compounds for use in the present invention are those which have a spectral emission falling between 330 millimicrons and 800 millimicrons and which are at least partially soluble in any of the above diluents, if such diluent is employed. Among these are the conjugated polycyclic aromatic compounds having at least 3 fused rings, such as: anthracene, substituted anthracene, benzanthracene, phenanthrene, substituted phenanthrene, naphthacene, substituted naphthacene, pentacene, substituted pentacene, and the like. Typical substituents for all of these are phenyl, lower alkyl, chlorine, bromine, cyano, alkoxy ($C_1$–$C_{16}$), and other like substituents which do not interfere with the light-generating reaction contemplated herein.

Numerous other fluorescent compounds having the properties given hereinabove are well known in the art. Many of these are fully described in "Fluorescence and Phosphorescence," by Peter Pringsheim, Interscience Publishers, Inc. New York, N.Y., 1949. Other fluorescers are described in "The Colour Index," second edition, volume 2, The American Association of Textile Chemists and Colorists, 1956, pp. 2907–2923. While only typical fluorescent compounds are listed hereinabove, the person skilled in the art is fully aware of the fact that this invention is not so restricted and that numerous other fluorescent compounds having similar properties are contemplated for use herein.

It should be noted, however, that although a fluorescent compound is necessary to obtain the production of light, the fluorescent compound is not necessary to obtain a chemical reaction and chemical energy release. Also, fluroescent amides (for example), such as the oxalic amide of 2-aminoacridine, does not require a separate fluorescent compound to obtain light. Other typical fluorescent oxalic amides include the amides of oxalic acid from (1) 9-aminoacridine, (2) 9-methyl-1-amino-acridine, (3) 4-methoxy-7-methoxyquinoline, and the like. Also, the hydroperoxide may be a fluorescent compound. Thus, a composition which "includes at least one fluorescent compound" would include (1) a typical and conventional fluorescer or percusor thereof and/or (2) an electronegatively N-substituted nitrogen derivative of oxalic-type acid which includes a substituent which is a fluorescer or precusor thereof, and/or (3) a hydroperoxide which includes a substituent which is a fluorescer or a precursor thereof, and the like.

It has been found that the molar (moles per liter of diluent) concentrations of the major components of the novel composition hereindescribed may vary considerably. It is only necessary that components be in sufficient concentration to obtain chemiluminescence. The amide of oxalic or oxalic-type acid molar concentration normally is in the range of at least about $10^{-7}$ to 5 molar, preferably in the range of at least about $10^{-4}$ to about 1 molar; the fluorescent compound is present in the range from about $10^{-5}$ to 5, preferably $10^{-4}$ to $10^{-1}$ molar; and the water or other diluent must be present in a sufficient amount to form at least a partial solution of the reactants involved in the chemiluminescent reaction. There is no known maximum limit on the concentration of amide employed in the reaction. The amide may serve as either the sole diluent or a partial diluent.

The ingredients of the composition of this invention may be admixed in a single stage of admixing or in a sequence of steps of admixing the separate ingredients. Accordingly, alternative compositions may be prepared which may be stored over a period of time and which may be admixed with the final ingredient at a time when the chemiluminescent lighting is desired. For example, one such composition would be a composition which includes an oxalic amide and a fluorescent compound but which does not include a peroxide compound. Another alternative composition would be a composition which includes the fluorescent compound and a peroxide, but which does not include the oxalic amide. Another alternative composition would be a solid composition which includes a solid oxalic-type amide and a solid hydroperoxide compound, and possibly additionally includes a solid fluorescent compound, but which does not include a diluent. Obviously, the preferred compositions which would be less than all necessary components to produce a chemiluminescent light would be a composition which would be substantially stable to a practical degree over an extended period of time; otherwise, there would be no real advantage in forming a chemiluminescent reactant to be employed in a subsequent chemiluminescent reaction.

The wavelength of the light emitted by chemiluminescence of the compositions of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Although in the process of obtaining chemiluminescent light according to this invention, it is normally not necessary to employ a specific order of sequence of steps in the adding of the individual ingredients of the inventive chemiluminescent composition, it has been found that the fluorscent component preferably should be already in the reaction mixture at the time of addition of the last component necessary to bring about the chemical reaction and the concurrent release of chemical energy.

Additionally, it has been found that the superior intensity of chemiluminescence is obtained when the final mixture producing the luminescence is maintained at a temperature of between about −40° C. and 75° C., preferably between about 20° C. and 50° C.; however, the luminescence of applicants' process is not limited to these ranges. However, temperature is not critical.

Additionally, the composition and the process which obtains preferred optimum chemiluminescent light intensity employs a base in an amount sufficient to produce a basic pH. Any suitable base which does not interfere with the chemiluminescent composition and process of this invention may be employed.

The maximum effective pH will vary, depending upon the particular chemiluminescent compound, and the solvent employed. However, normally pH 12 is about the maximum. The alkaline material employed in the preferred embodiment of this invention may be any one or more of conventional alkaline substances, such as sodium carbonate, potassium carbonate, ammonium carbonate, calcium carbonate, sodium hydroxide, potassium hydroxide, calcium hydroxide, ammonium hydroxide, and the like, as well as organic alkaline materials, such as triethylamine, pyridine, and the like. Any carbonate or hydroxide of an alkali metal or of an alkaline earth is suitable. Evidence indicates that the weaker alkaline materials are as suitable as, if not preferred to, the stronger alkaline materials.

A wide variety of organic and inorganic bases is contemplated, other typical bases being: potassium tertiary butoxide, sodium ethoxide, sodium methoxide, ammonium hydroxide, tetrabutyl ammonium hydroxide, and triphenyl methide; other Lewis bases, including triethylamine, quinoline, and the like; etc.

The composition of this invention, prior to admixing to obtain the chemiluminescent reaction and light production, may include any one or more additional necessary ingredients in admixture with the chemiluminescent compound, provided that a diluent is not included. Addition of a diluent would cause reaction to proceed.

The lifetime and the intensity of the chemiluminescent light can be regulated by the use of certain regulator such as:

(1) By the addition of base to the chemiluminescent composition. Both the strength and the concentration of the base are critical for purposes of regulation.

(2) By the variation of hydroperoxide. Both the type and the concentration of hydroperoxide are critical for the purposes of the regulation.

(3) By the addition of water.

(4) By the addition of a catalyst which changes the rate of reaction of hydroperoxide with the oxalic-type amide. Catalysts which accomplish that objective include those described in M. L. Bender, Chem. Revs., vol. 60, p. 53 (1960).

Pursuant to the present invention disclosed herein, light is generated and the light emissions last anywhere from an instantaneous and momentary emission up to about 100 times longer than that of the art-known aqueous compositions described hereinbefore, such as oxalyl chloride. The rate can be regulated as might be desired for any particular situation with the present invention.

The following examples are intended to illustrate the present invention and are in no way intended to limit the invention except as limited in the appended claims.

Examples I–VI

The test experiments of Examples I through VI are carried out as follows, for the respective test procedures A, B, C and D:

(A) Approximately 3–5 mg. of the compound to be tested is added to a 5 ml. solution of about 1 mg. 9,10-diphenylanthracene (DPA) and 0.2 ml. anhydrous $H_2O_2$ in anhydrous 1,2-dimethoxyethane maintained at 25° C. Note that no alkaline material is included.

(B) Approximately 3–5 mg. of the compound to be tested is added to a 5 ml. slurry of 1 mg. DPA, 0.2 g. KOH (1 pellet) and 0.2 ml. anhydrous $H_2O_2$ in anhydrous 1,2-dimethoxyethane maintained at 25° C. This is an alkaline medium.

(C) Approximately 3–5 mg. of the compound to be tested is added to a 5 ml. solution of 1 mg. DPA and 0.2 ml. $CH_3SO_3H$ and 0.2 ml. of 90% $H_2O_2$ in 1,2-dimethoxyethane and maintained at 25° C. This is an acid medium.

(D) Approximately 3–5 mg. of the compound to be tested is added to 5 ml. of anhydrous dimethylphthalate containing 1 mg. of DPA, 0.2 ml. of 50% KOH and 0.2 ml. of 90% $H_2O_2$. This is an alkaline medium.

Example I

In Example I, the N-substituted nitrogen derivative of oxalic acid, i.e., the amide, is diphenyloxamic acid, for tests A through D. The results are negative, i.e., no light is obtained for all tests, as illustrated in Table I below. This compound is not strongly electronegatively N-substituted.

Example II

In Example II, the amide is tetraphenyloxamide, which is not strongly electronegatively N-substituted, and as in Example I, no light is observed, in tests A through D, as illustrated in Table I below.

Example III

In Example III, the amide is 2,2′4,4′-tetranitrooxanilide and for tests A and B, only B obtains light, as illustrated in Table I. This compound is strongly electronegatively N-substituted.

Example IV

In Example IV, the amide is N,N′-bis(phenylsulfonyl)-oxanilide and for tests A through D, tests B and D obtain light whereas tests A and C fail to obtain light as illustrated in Table I below. This compound is strongly electronegatively N-substituted, and light is obtained only in alkaline media (B and D). The intensity and lifetime of this type of compound is unexpectedly greater than that of other "amides" of this invention, and represent a marked and substantial improvement on the basic amide system of the broad invention disclosed herein.

Example V

In Example V, the amide is bis(4-nitrophthalyl)-oxamide, for tests A, B and C, the acid media test C fails to obtain light, the substantially neutral media test A obtains a very weak light production, while the alkaline media test B obtained the light, as illustrated in Table I below. This is a strongly electronegatively N-substituted oxalic acid derivative.

Example VI

In Example VI, the amide is di-1-imidazolylglyoxal, is a strongly electronegatively N-substituted derivative of oxalic acid, and obtains a very weak light production for test A and obtains light for test B, as illustrated in Table I. Again, the alkaline media obtains the preferred results.

Compound IV in Table I provides light of greater intensity and longer lifetime than does compounds III, V and VI.

TABLE I.—QUALITATIVE CHEMILUMINESCENCE TESTS OF OXALIC AMIDES

| Compound | | Tests [1] | | | |
|---|---|---|---|---|---|
| | | A | B | C | D |
| Example: | | | | | |
| I | Diphenyloxamic acid | (−) | (−) | (−) | (−) |
| II | Tetraphenyloxamide | (−) | (−) | (−) | (−) |
| III | 2,2′,4,4′-tetranitrooxanilide [2] | (−) | (+) | XX | XX |
| IV | N,N′-bis(phenylsulfonyl)oxanilide | (−) | (+) | (−) | (+) |

See footnotes at end of table.

| Compound | Tests [1] | | | |
|---|---|---|---|---|
| | A | B | C | D |
| Example: | | | | |
| V 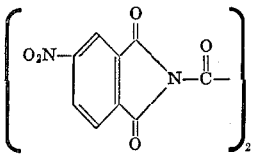 bis(4-nitrophthalyl)oxamide | (+) (weak) | (+) | (−) | XX |
| VI 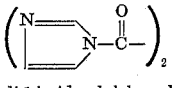 di-1-imidazolylglyoxal | (+) (weak) | (+) | XX | XX |

[1] The symbol (+) signifies that a chemiluminescent light was observed, the symbol (−) indicates that no light was observed, and XX indicates that this test was not performed.
[2] Compound III is a new compound and is a part of this invention.

It can be seen from Table I that when the substituent (i.e., nitro, benzenesulfonyl, etc.) of the substituted oxalic amides has a positive Hammett sigma value*, in general, superior chemiluminescence is observed.

Examples VII–XXIII

The superior amide of Example IV is further tested by procedures E, F, G, and H, employing different solvents as the diluent and employing varying concentrations of alkaline material. Procedures E through H, respectively, are as follows:

(E) Approximately 3–5 mg. of amide is added to 1 mg. of fluorescein, 0.2 ml., of 90% hydrogen peroxide and 0.2 ml. of 50% potassium hydroxide in 5 ml. of solvent.

(F) The same as E, except 0.2 ml. of 5% potassium hydroxide is used.

(G) The same as E, except 0.2 ml. of 10% sodium carbonate is used.

(H) The same as E, except no base is used.

Examples VII through XI and XIX employ procedure (E). The 50% KOH obtains a pH of high alkalinity.

Examples XII, XVII, and XX employ procedure (F).
Examples XIII, XVIII and XXI employ procedure (G).
Examples XIV, XV, XVI, XXII and XXIII employ procedure (H).

Example VII employs solely tetrahydrofuran.
Example VIII employs solely dimethylsulfoxide.
Example IX employs solely ethanol.
Example X employs solely acetonitrile.
Examples XI, XII, XIII and XIV employ solely 1,2-dimethoxyethane.
Example XV employs both 1,2-dimethoxyethane and water, in a ratio of 4:1.
Examples XVI, XVII and XVIII employ both 1,2-dimethoxyethane and dimethylphthalate, in a ratio of 1:9.
Examples XIX, XX, XXI and XXII employ solely dimethylformamide.
Example XXIII employs both dimethylformamide and water.

Note that Example X is the sole system employed which obtains chemiluminescence when employing the high alkaline pH, and that the solvent employed is acetonitrile which is characterized by a very high order of polarity.

Procedures F and G typically illustrate the alkaline pH within the preferred range. Also, procedures F and G illustrate the employment of substantially different types of alkaline material, i.e., potassium hydroxide (KOH) and sodium carbonate ($NaCO_3$).

Procedure H illustrates the importance of the preferred embodiments having at least sufficient alkaline material included to obtain a pH more than pH 7.

Table II below illustrates the results of Examples VII through XXIII. The effect of change in solvent and decrease in strength of base on the chemiluminescence of IV is listed in Table II.

TABLE II.—QUALITATIVE CHEMILUMINESCENCE TESTS WITH N,N'-bis-(PHENYLSULFONYL) OXANILIDE

| Test number | Test | Solvent(s) | Chemiluminescence [a] |
|---|---|---|---|
| VII | E | Tetrahydrofuran | N. |
| VIII | E | Dimethylsulfoxide | N. |
| IX | E | Ethanol | N. |
| X | E | Acetonitrile | W—4 minutes.[b] |
| XI | E | 1,2-dimethoxyethane | N. |
| XII | F | ----do---- | M—9 minutes. |
| XIII | G | ----do---- | M—95 minutes, then W—5½ hours. |
| XIV | H | ----do---- | N.[c] |
| XV | H | 1,2-dimethoxyethane and water (4:1). | N.[c] |
| XVI | H | 1,2-dimethoxyethane and dimethylphthalate (1:9). | N. |
| XVII | F | 1,2-dimethoxyethane and dimethylphthalate (1:9). | W.[b] |
| XVIII | G | 1,2-dimethoxyethane and dimethylphthalate (1:9). | N.[d] |
| XIX | E | Dimethylformamide | N. |
| XX | F | ----do---- | W—3 minutes. |
| XXI | G | ----do---- | M—25 minutes, then W—5½ hours. |
| XXII | H | ----do---- | N.[c] |
| XXIII | H | Dimethylformamide and water (4:1). | N.[e] |

[a] The letters N, W, M are used for none, weak and medium.
[b] The reaction occurred in a heterogeneous medium.
[c] Light of medium intensity was observed for 15–30 minutes when 0.2 ml. of 10% sodium carbonate was added. Lifetime of light with weaker intensity was 2–4 hours.
[d] Dilution with 10 ml. of 1,2-dimethoxyethane gave a weak light.
[e] Addition of 0.2 ml. 10% sodium carbonate produced light of medium intensity for 2 minutes.

As indicated in Table II, the best results in terms of intensity and lifetime were obtained with 10% sodium carbonate in polar solvents (see for example, Examples XIII and XXI). The lifetime of the light provided by N,N'-bis(phenylsulfonyl) oxanalide is much greater than that from oxalyl chloride.

Light of identical intensity is observed whether the last component added to the chemiluminescent system is N,N'-bis(phenylsulfonyl) oxanalide, or hydrogen peroxide, or 9,10-diphenylanthracene. Thus, chemiluminescence is obtained by any order of mixing the reagents.

Chemiluminescence from N,N'-bis(phenylsulfonyl) oxanilide, 90% hydrogen peroxide, 10% sodium carbonate and fluorescein is provided in a broad temperature range (i.e., 0–65°). Chemiluminescence is also observed when water is present up to the concentration at which it causes insolubility of the amide used. Replacement of 90% hydrogen peroxide with various peroxides, such as cyclohexananoneperoxide t-butyl-hydroperoxide and perbenzoic acid also provides chemiluminescence.

*L. P. Hammett, "Physical Organic Chemistry," McGraw-Hill, Co. Inc., New York, 1940, pp. 184–199.

It is within the scope of this invention to make such modifications of the compositions and processes disclosed herein as would be obvious to a person of ordinary skill in this art, and it is to be understood that the examples illustrating this invention are intended to limit the invention only insofar as is stated in the specification and as the following claims are limited. Also, it is within the scope of this invention to form an apparatus or article such as a container which, for example, may be either (1) a substantially insoluble or alternatively (2) a dissolvable capsule in which the reactant or composition of this invention is substantially enclosed for subsequent reaction with other ingredients necessary to produce chemiluminescent light.

We claim:

1. A composition comprising a first chemiluminescent reactant and at least one additional second ingredient selected from the group consisting of a fluorescent compound and a hydroperoxide compound, said first reactant comprising a major amount of an amide of an acid of the oxalic-type acid formula:

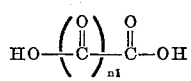

where $n^1$ ranges from 1 to about 4, and where a parent-amine of said amide is sufficiently electron-attracting to be at least as acidic as 4-nitroaniline.

2. A composition according to claim 1, including a hydroperoxide compound.

3. A composition according to claim 1, including an alkaline material, where said composition includes at least one fluorescent compound.

4. A composition according to claim 1, in which said amide is a strongly-electronegatively N-substituted and is of the oxalic-type acid-derivative formula:

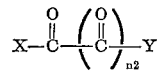

where $n^2$ ranges from 1 to about 4; where X is an an N-substituted member, selected from the group consisting of (a) $\begin{array}{c} R^1 \\ \diagdown \\ \phantom{R^2}N- \\ \diagup \\ R^2 \end{array}$ (b) $\begin{array}{c} Z \\ \diagdown \\ \phantom{R^3}N- \\ \diagup \\ R^3 \end{array}$ (c) $(R^4)_2 N-$ (d) $(R^5)_2 N-$, (e) $R^6-N=N-$, and (f) strongly electronegatively N-substituted nitrogen-containing heterocyclic compound where N— is attached directly to a carbonyl carbon in said oxalic-type acid-derivative formula; where R' and $R^5$ are each selected from the electronegative group consisting of (a) mono-, poly-, and heterocyclic aromatic compounds substituted by at least one electronegative group, where the electronegative group on said aromatic compound is a member selected from the group consisting of (A) a nitro, (B) a halogen, provided at least three halogen substituents are present in said amide, (C) 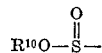

(D) $\begin{array}{c} O \\ \| \\ R^8-S- \end{array}$ (E) $\begin{array}{c} O \\ \| \\ R^9O-S- \\ \| \\ O \end{array}$ (F) 

where $R^7$ and $R^8$ are each selected from the group consisting of alkyl, aryl, cycloalkyl, heterocyclic, and polycyclic substituent and $R^9$ and $R^{10}$ are each selected from the group consisting of hydrogen and the members of $R^7$, (G) a cyano, (H) a polyfluoroalkyl substituent, and (I) an acyl substituent of the formula

where $R^{11}$ is selected from the group consisting of alkyl, aryl, cycloalkyl, heterocyclic, and polycyclic substituents, provided that said aromatic compound includes a sufficient number of electronegative members for a parent-N(hydrogen-substituted) nitrogen-derivative thereof to have an acidity at least as great as 4-nitroaniline, (b) a polysubstituted (fluoroalkyl, and (c) an acyl of the formula $\begin{array}{c} R^{12}-C- \\ \| \\ O \end{array}$ where $R^{12}$ is defined the same as $R^{11}$; where $R^2$ and $R^6$ are each selected from the group consisting of hydrogen and the members of $R^4$, where $R^4$ is selected from the group consisting of alkyl, aryl, cycloalkyl, heterocyclic, polycyclic, amino, and alkyl-, aryl- and acyl-substituted amino substituents; where $R^3$ is selected from the group consisting of the members of both $R^1$ and $R^2$; where Z is a member selected from the group consisting of the members of (a) cyano, (b) nitrosyl, and (c) nitroxyl; and where Y is a member selected from the group consisting of hydroxy and the members of X.

5. A composition according to claim 4, including at least one fluorescent compound, a hydroperoxide compound and an alkaline material in an amount to obtain a pH of above pH 5 up to about pH 12 when a diluent is present.

6. A composition according to claim 7, in which said first reactant is a compound of the formula:

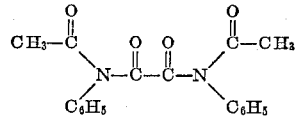

7. A process to produce chemiluminescent light, comprising admixing (1) a first reactant comprising a major amount of an amide of an acid of the oxalic-type acid formula:

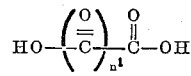

where $n^1$ ranges from 1 to about 4, and where a parent-amine of said amide is sufficiently electron-attracting to be at least as acidic as 4-nitroaniline, with (2) a diluent, and (3) a hydroperoxide compound.

8. A process according to claim 7, where said admixing includes at least one fluorescent compound in the admixture, and includes alkaline material in an amount at least sufficient to obtain a pH above pH 5 up to about pH 12.

References Cited

E. A. Chandross: "A New Chemiluminescent System," Tetrahedron Letters No. 12, pp. 761–65 (1963).

LEON D. ROSDOL, *Primary Examiner.*

J. D. WELSH, *Assistant Examiner.*

U.S. Cl. X. R.

252—301.2, 408

PO-1050
(5/69)

UNITED STATES PATENT OFFICE
CERTIFICATE OF CORRECTION

Patent No. 3442815                    Dated  May 6, 1969

Inventor(s) MICHAEL MCKAY RAUHUT and LASZLO JOSEPH BOLLYKY

It is certified that error appears in the above-identified patent and that said Letters Patent are hereby corrected as shown below:

Column 2, Line 15 "20,706" should read -- Serial No. 425,599 filed January 14, 1965 (now abandoned) refiled as Serial No. 485,920 filed September 8, 1965 --.

Column 2, Line 17 "20,829" should read -- Serial No. 491,896 filed September 30, 1965 (now abandoned) refiled as Serial No. 619,140 filed on February 28, 1967 --.

Column 4, Line 54 "R' " should read -- $R^1$ --.

Column 5, Line 1 "R'" should read -- $R^7$ --.

Column 5, Line 11 "R" " should read -- $R^{11}$ --.

Column 6, Line (b) "N,N-bis" should read -- N,N' bis --.

Column 18, Line 74 "cyclohexananoneperoxid" should read -- cyclohexanoneperoxide --.

SIGNED AND
SEALED
NOV 10 1970

(SEAL)
Attest:

Edward M. Fletcher, Jr.
Attesting Officer

WILLIAM E. SCHUYLER, JR.
Commissioner of Patents